United States Patent
Mase et al.

(10) Patent No.: US 7,267,866 B2
(45) Date of Patent: Sep. 11, 2007

(54) HEAT CONTROL METHOD AND HEAT CONTROLLER

(75) Inventors: Ichiro Mase, Tokyo (JP); Yasuyuki Nakamura, Kanagawa (JP); Yuichi Shimakawa, Tokyo (JP); Mayumi Kosaka, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 338 days.

(21) Appl. No.: 09/900,771

(22) Filed: Jul. 6, 2001

(65) Prior Publication Data

US 2002/0003229 A1    Jan. 10, 2002

(30) Foreign Application Priority Data

Jul. 7, 2000    (JP)    ............................. 2000-207109

(51) Int. Cl.
    *B32B 18/00*    (2006.01)
    *G21F 1/06*    (2006.01)
    *G21F 1/12*    (2006.01)
(52) U.S. Cl. ...................... 428/216; 428/689; 428/699; 428/701; 428/702; 237/81; 236/1 R; 250/505.1; 250/515.1; 250/517.1
(58) Field of Classification Search ................ 428/332, 428/913, 334, 337; 165/96, 133, 85, 41

See application file for complete search history.

(56) References Cited

U.S. PATENT DOCUMENTS

| | | | | |
|---|---|---|---|---|
| 3,565,671 A | * | 2/1971 | Teeg et al. | 428/332 |
| 4,666,760 A | * | 5/1987 | Hasuda et al. | 428/215 |
| 4,669,685 A | * | 6/1987 | Dalby | 244/158 R |
| 5,296,285 A | * | 3/1994 | Babel et al. | 428/213 |
| 5,439,706 A | * | 8/1995 | Richards et al. | 427/244 |
| 5,519,566 A | * | 5/1996 | Perino et al. | 361/321.4 |
| 5,527,767 A | * | 6/1996 | Setsune et al. | 505/480 |
| 6,005,771 A | * | 12/1999 | Bjorndahl et al. | 361/699 |
| 6,176,453 B1 | * | 1/2001 | Long et al. | 244/158 |
| 6,432,474 B1 | * | 8/2002 | Nakanishi et al. | 427/126.3 |
| 2001/0027856 A1 | * | 10/2001 | Okamoto et al. | 165/96 |

FOREIGN PATENT DOCUMENTS

EP    0919647 A1 *    6/1999

(Continued)

OTHER PUBLICATIONS

JPO Abstract Translation of JP 11-162774-A (DOC ID: JP 11162774 A).*

(Continued)

*Primary Examiner*—Kevin M. Bernatz
(74) *Attorney, Agent, or Firm*—Dickstein Shapiro LLP

(57) ABSTRACT

A heat controller for an object, having a composite material formed of a base material radiating a large amount of heat at a high-temperature phase and a phase-change substance having insulation properties at a high-temperature phase, having metallic properties at a low-temperature phase, radiating a small amount of heat at a low-temperature phase, and having a high reflectivity in the thermal infrared region at a low-temperature phase.

19 Claims, 3 Drawing Sheets

FOREIGN PATENT DOCUMENTS

| | | |
|---|---|---|
| JP | 2588633 | 12/1996 |
| JP | 2625821 | 4/1997 |
| JP | 2705657 | 10/1997 |
| JP | 11-162774 A * | 6/1999 |
| JP | 11-217562 * | 8/1999 |
| JP | 11-217562 A * | 8/1999 |
| JP | 11217562 | 8/1999 |
| JP | 2001-115102 | 4/2001 |
| JP | 2001-310800 | 11/2001 |
| JP | 63-207799 | 8/1988 |
| JP | 5-77799 | 3/1993 |
| JP | 5-280694 | 10/1993 |
| JP | 05-286702 * | 11/1993 |

OTHER PUBLICATIONS

Derwent Abstract of JP 05-286702-A (Derwent Acc. No. 1993-382881).*
Derwent Abstract of KR 2001-036859-A (Derwent Acc. No. 2002-289452).*
JPO Abstract Translation of JP 11-217562 A (Pat-No. JP411217562 A, Aug. 10, 1999).*
Japanese Office Action dated Aug. 17, 2004 (and English translation of relevant portion).

* cited by examiner

HEAT CONTROL METHOD AND HEAT CONTROLLER

BACKGROUND OF THE INVENTION

1. Field of the Invention

The present invention relates to a heat control method and a heat controller, and more particularly to a heat control method and heat control apparatus suitable for use in heat control of heat generated by electronic equipment mounted aboard a space vehicle including a man-made satellite and a spaceship.

2. Related Art

In general, in a space vehicle traveling through a vacuum environment, radiation of heat into space via the outer skin of the space vehicle serves as a means of heat regulation for the space vehicle.

For this reason, many techniques have been developed to prevent a great increase or a great decrease in temperature and for maintaining the temperature within an appropriate range when there are large changes in the amount of internally generated heat within the space vehicle.

For example, the approach of providing a temperature-control circuit separate from the electronic equipment, and that of using a thermal louver system, such as shown in FIG. 6 of the Japanese unexamined patent publication (KOKAI) No.11-217562 are known.

The provision of a separate temperature-control circuit, however, not only increases the mass of the space vehicle and the amount of energy consumed, but also leads to an inevitable increase in the internal volume of the space vehicle, and increases the number of moving parts used therein, which leads to problems of low reliability and lifetime.

In Japanese patent No. 2705657, there is shown a method whereby a phase-transition substance is provided between a stable heat source within a man-made satellite and a component of the man-made satellite having a heat radiating surface exhibiting great thermal variations, wherein temperature control is performed, the phase-transition substance having a small thermal conductivity at a high temperature and a large thermal conductivity at a low temperature.

However, the above-noted constitution with regard to thermal conductivity at a low-temperature phase and thermal conductivity at a high-temperature phase is the reverse of the constitution of the present invention, to be described below, making efficient temperature control impossible.

In Japanese patent No. 2588633, there is disclosure of a temperature controller for electronic equipment in a space vehicle, this being formed by a vessel into which a phase-change substance is sealed, a heat pip in intimate contact with the vessel, and an electric heater in intimate contact with an outer surface of the vessel. However, because additional equipment requiring a separate heater increases in weight, this is not suitable for use in a space vehicle.

Additionally, in Japan patent 2625821, there is disclosure of a heat controller for a man-made satellite, in which a phase-transition substance having a low infrared radiation efficiency at a high-temperature phase, and having a high infrared radiation efficiency at a low-temperature phase is disposed between a piece of payload equipment temperature control and a heat sink. However, the constitution in this heat controller with respect to the infrared radiation efficiencies at low- and high-temperature phases is the reverse of that in the present invention, described below, and it is impossible to perform efficient temperature control.

In the Japanese unexamined patent publication (KOKAI) No.63-207799, a configuration in which a single phase-change substance made of vanadium dioxide is disposed between a piece of payload equipment and a heat sink. However, this uses a different phase-change substance than the present invention, which is described below, the method of use thereof is also different, and it does not enable efficient temperature control.

In the Japanese unexamined patent publication (KOKAI) No.11-217562, as shown in FIG. 2, there is a proposal of, rather than relying on a mechanical principal, simply using the heat radiation characteristics of a phase-change substance made of perovskite Mn oxide or the like, used in the heat controller to control the temperature.

Specifically, the example shown is one in which a phase-change substance 1 is directly attached to a heat radiating surface 5 of the object 3, which is a piece of electronic equipment requiring heat control.

In the above-noted examples of known technology, however, the phase-change substance used is one type, perovskite Mn oxide or the like, so that at high temperatures the heat radiation efficiency is high and at low temperatures the heat radiation efficiency is low.

In a heat controller using the above-noted known phase-change substance, because it is necessary to achieve a high radiation efficiency with the phase-change substance alone at a high-temperature phase, it was necessary to have a thickness of several hundred microns.

In the case of using perovskite Mn oxide as a phase-change substance, because of the high density (6.6 g/cm$^3$) of this substance, at a thickness of 200 μm, for example, the weight of the required amount of material would be as much as 1.3 kg/m$^2$.

Furthermore, because this phase-change substance is a ceramic material and having hard condition, it has the drawback of making it impossible to achieve a phase-change substance that is both thin and flexible.

Although this phase-change substance has only 1/3 to 1/5 the mass of a thermal louver having the same function and which is opened and closed by a blade or bi-metal element having the same function, this is still insufficient to meet the stringent weight requirements of a space vehicle, and there is a need for even further reduction in mass.

Additionally, because the phase-change substance is a solid and does not exhibit flexibility, it is difficult to mount it to an object having a curvature, thereby limiting its scope of application.

The shape of a space vehicle includes curved surfaces, and if mounting were possible to these surfaces, there would be a further enhancement in the range of applicability. However, as long as use is limited to a single layer of the above-noted phase-change substance of the past, it was difficult to achieve a practical heat controller in the past.

Accordingly, it is an object of the present invention to improve on the above-noted drawbacks of the prior art, by providing a heat controller and a method for controlling heat, which is lighter and higher in performance than a heat controller having equivalent heat radiation characteristics in the past.

It is a further object of the present invention to provide a heat controller wherein a phase-change substance, which in the past needed to have a thickness of several hundred microns or more, is formed as a film having a thickness of approximately several microns on a low-density base material, and which has heat radiation characteristics equivalent to a heat controller in the past.

It is yet another object of the present invention to provide a heat control and a method for controlling heat in which flexibility is imparted so as to enable application to an object having curvature.

SUMMARY OF THE INVENTION

To achieve the above-noted objects, the present invention adopts the following described basic technical constitution.

Specifically, a first aspect of the present invention is a heat controller in which a composite material formed by combining a base material radiating a large amount of heat at a high-temperature phase with a phase-change substance having insulation properties at a high-temperature phase, having metallic properties at a low-temperature phase, radiating a small amount of heat at a low-temperature phase, and having a high reflectivity in the thermal infrared region at a low-temperature phase, so as to control the temperature of an object.

A second aspect of the present invention is a method for controlling heat, whereby a composite material formed by combining a base material radiating a large amount of heat at a high-temperature phase with a phase-change substance having insulation properties at a high-temperature phase, having metallic properties at a low-temperature phase, radiating a large amount of heat at a high-temperature phase, radiating a small amount of heat at a low-temperature phase, and having a high reflectivity in the thermal infrared region at a low-temperature phase is mounted either directly or indirectly to an object, so as to control the temperature thereof.

By adopting the above-noted technical constitution, a heat controller and a method for controlling heat according to the present invention achieve characteristics equivalent to a heat controller of the past that used a phase-change substance, and provide a heat controller that can be made lighter in weight.

More specifically, in the present invention, a phase-change substance 1 having a thickness of several microns (μm) to 30 microns (μm) and having insulation properties at a low-temperature phase and metallic properties at a high-temperature phase is formed by a coating method, a printing method with a thick film, a vapor deposition method or the like, on a low-density base material made of silicon, alumina, partially stabilized-zirconia, or the like, having a thickness of 10 to 100 microns (μm) with sufficient strength and toughness and having a high radiation ratio, the resulting composite material being mounting so as to be in good thermal contact with an object requiring heat control, thereby forming a heat controller with a simple configuration.

Additionally, by using a flexible foil or film as the base material, application of the heat controller to electrical equipment having curvature is possible, thereby broadening the range of application of the heat controller and enhancing the degree of freedom.

DETAILED DESCRIPTION OF THE PREFERRED EMBODIMENTS

Embodiments of a heat controller and a method for controlling heat according to the present invention are described in detail below, with references made to relevant accompanying drawings.

Figure 1:
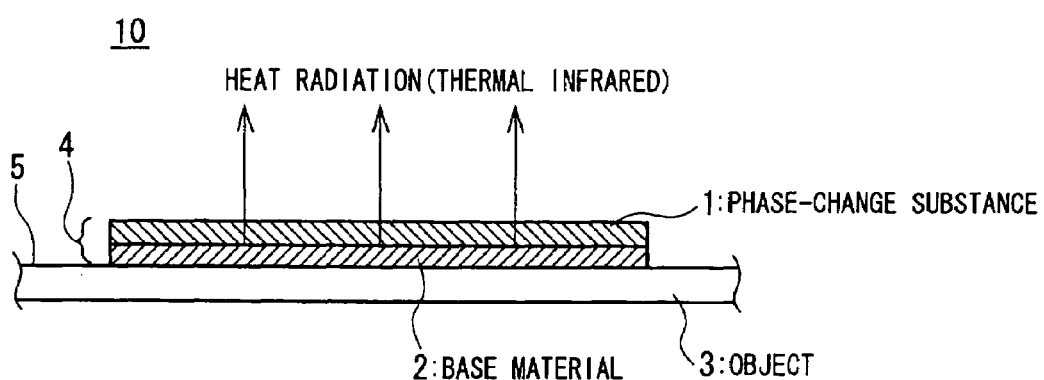
FIG. 1 is a cross-sectional view showing a specific configuration of a heat controller according to the present invention.
Figure 2:
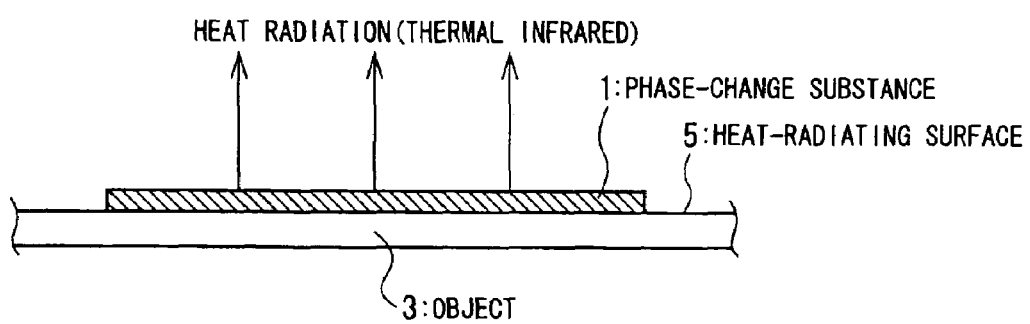
FIG. 2 is a cross-sectional view showing an embodiment configuration of a heat controller of the past.

Specifically, FIG. 1 is a drawing showing a specific embodiment of a heat controller 10 according to the present invention, this drawing showing a heat controller 10 in which base material 2 radiating a large amount of heat at a high-temperature phase is combined with a phase-change substance 1 having insulating properties at a high-temperature phase, having metallic properties at a low-temperature phase, radiating large amount of heat at a high-temperature phase, radiating a small amount of heat at a low-temperature phase, and having a high reflectivity in the thermal infrared region at a low-temperature phase, thereby forming a composite material 4 so as to control the temperature of an object 3.

The phase-change substance 1 used in the present invention preferably has a thickness in the range from one to 30 microns (μm).

The base material 2 used in the present invention has a thickness that is greater than that of the phase-change substance 1, and preferably a thickness in the range from 10 μm to 100 μm, and more preferably a thickness in the range from 30 μm to 50 μm.

In the present invention, a method usable for laminating the above-noted phase-change substance 1 and the base material 2 is, for example, that of laminating the phase-change substance 1 having a thickness of one to several microns onto the surface of the base material 2 by a coating method in that the phase-change substrate is grinded into powdered condition, a printing method with a thick film in that a paste like phase-change substance is printed and baked, or a vapour deposition method or the like, and additionally the base material 2 is mounted on a surface of the object 3 the temperature of which is controlled with a good thermal contact therebetween.

It is desirable that the phase-change substance 1 used in the present invention be a perovskite oxide, such as perovskite Mn oxide.

Specifically, perovskite oxides that can be used in the present invention are perovskite oxides including Mn, the chemical composition of which can be expressed in the general form A1-xBxMn (where A is at least one rare earth ion selected from the group consisting of La, Pr, Nd, and Sm, and B is at least one alkali earth metal ion selected from the group consisting of Ca, Sr, and Ba).

In the present invention, it is also possible to use a corundum vanadium oxide including Cr, the chemical composition of which can be expressed in the general form $(V_{1-x}Cr_x)_2O_3$.

The base material 2 used in the present invention can be silicone, alumina, partially stabilized-zirconia, or the like, and it is desirable that this base material 2 exhibit flexibility, in the form of a sheet or film, so that it can be bent or curved.

In the present invention, it is desirable that the composite material 4 be affixed, either directly or indirectly via an appropriate heat-conducting substance, to a surface of the object 3, which is a heat-generating body, and desirable that an appropriate adhesive be used to achieve a thermal joining to the object.

Additionally, the object 3 in the present invention is not restricted to being a flat-surface part of a spacecraft, and can also be any non-flat part thereof, including spherically curved parts, simple-curved parts, or parts exhibiting surface unevenness, and the heat controller 10 according to the present invention can be affixed to any such surface of the object 3.

The object 3 in the present invention encompasses a man-made satellite, a space vehicle, or the like, and includes electrical and electronic equipment used in a space vehicle.

The configuration and operation of the heat controller 10 according to the present invention is described in further detail below.

Specifically, with regard to the action and operation of the heat controller 10 according to the present invention, it is basically possible to understand the optical characteristics in terms of the behavior of the electrons and matrices of the base material, and if the substance is a good conductor, the reflectivity and dielectric constant thereof can be expressed as a light frequency and the characteristic plasma frequency of the substance.

Given the above-noted relationship, the thickness required of the phase-change substance for light reflection in the thermal infrared region at a low-temperature phase, in which the substance becomes metallic, can be much shorter than the electromagnetic waves incident to the surface thereof, so that for the thermal infrared region in which the wavelength is in the order of 10 μm, it is sufficient for the phase-change substance to have a thickness of 1 μm or greater to achieve a sufficiently high reflectivity and low radiation ratio.

In the case in which the substance is an insulator, if the thickness dose not exceed the wavelength of the incident electromagnetic waves, sufficient absorption and radiation are not be achieved.

From the above-noted characteristics of the phase-change substance 1, in the case in which the object 3 is at a low temperature, the amount of heat radiated by the phase-change substance 1, which is thermally joined to the object 3 is small, so that the amount of heat radiated into the external environment from the object 3 can be made small, thereby preventing a drop in the temperature of the object 3.

In contrast to the above situation, in the case in which the object 3 is at a high temperature, the phase-change substance 1 thermally joined thereto becomes an insulator, so that, although a phase-change substance 1 having a thickness of several microns cannot provide a sufficiently high radiation ratio in the thermal infrared region of several tens micron, the heat radiated by the base material 2 therebeneath, which has a high radiation ratio, passes through the phase-change substance 1, thereby making the amount of heat radiated from the surface of the phase-change substance 1 large.

By virtue of the above, it is possible to radiate a large amount of heat from into the external environment from the object 3, thereby limiting a rise in the temperature of the object 3.

In the heat controller 10 according to the present invention, when the temperature of the object 3 drops, because the temperature of the base material 2 that is thermally joined thereto also drops, the temperature of the phase-change substance 1 that is applied thereover by painting or vapor deposition or the like also decreases.

If the phase-change substance 1 drops below its phase-transition temperature, the radiation ratio thereof decreases, so that the amount of heat radiated to the external environment decrease, making it possible to limit the decrease in temperature of the object 3.

In contrast to the above situation, when the temperature of the object 3 increases, the temperatures of the base material 2 and the phase-change substance 1 thermally joined thereto also increase.

Although it is not possible for the phase-change substance 1 to radiate sufficient heat because of its thinness, the heat radiated from the base material 2 forming the underlayer thereof, which has a high heat radiation ratio, passes through the phase-change substance 1, it is possible to achieve a large amount of heat radiated from both of these elements combined.

For this reason, there is an increase in the amount of heat radiated into the external environment, thereby enabling a limitation of the temperature rise in the object 3.

Figure 3:
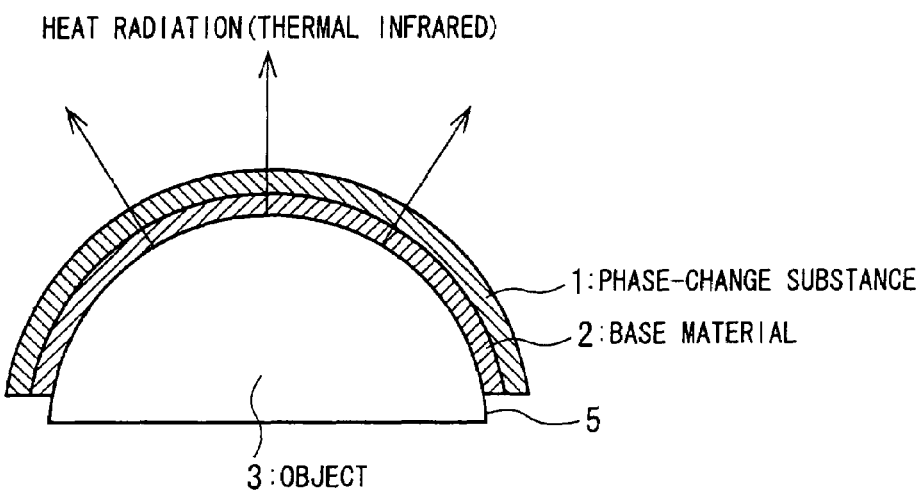
FIG. 3 is a cross-sectional view showing another specific embodiment of a heat controller according to the present invention.

Another specific embodiment of a heat controller 10 according to the present invention is described below, with reference made to FIG. 3.

Specifically, in this embodiment of the present invention, a flexible substance is used as the base material 2, a phase-change substance 1 having a thickness of several microns to 30 microns being applied by a printing method with a thick film, a coating or vapor deposition or the like onto a flexible base material 2 having a thickness ranging from several microns to 100 microns, and further the base material 2 is mounted to a surface of the object 3, which has a curved surface and the temperature of which is to be controlled, so that the base material 2 is in intimate thermal contact therewith.

Silicon, alumina, partially stabilized-zirconia, or the like, can be used as the flexible base material 2.

In a heat controller having a configuration as noted above, when the temperature of the object 3 decreases, the temperature of the base material 2 thermally joined thereto also decreases, so that the temperature of the phase-change substance 1 formed thereover by a printing method with a thick film, a coating method, vapor deposition method or the like also decreases.

When the phase-change substance 1 drops below its phase-transition temperature, the radiation ratio thereof decreases, so that the amount of heat radiated into the external environment decreases, making it possible to limit the decrease in temperature of the object 3.

In contrast to the above situation, when the temperature of the object 3 increases, the temperatures of the base material 2 and the phase-change substance 1 thermally joined thereto also increase.

Although it is not possible for the phase-change substance 1 to radiate sufficient heat because of its thinness, the heat radiated from the base material 2 forming the underlayer thereof, which has a high heat radiation ratio, passes through the phase-change substance 1, it is possible to achieve a large amount of heat radiated from both of these elements combined.

For this reason, it is possible to limit the temperature rise in the object 3.

Yet another embodiment of a heat controller according to the present invention is described below, with reference made to FIG. 4.

Specifically, in this embodiment of the present invention, a reflective sheet 6, which reflects visible light is laminated to the surface of the phase-change substance 1 on the opposite side from the surface to which the base material 2 is laminated, thereby forming a composite material 7.

Figure 4:
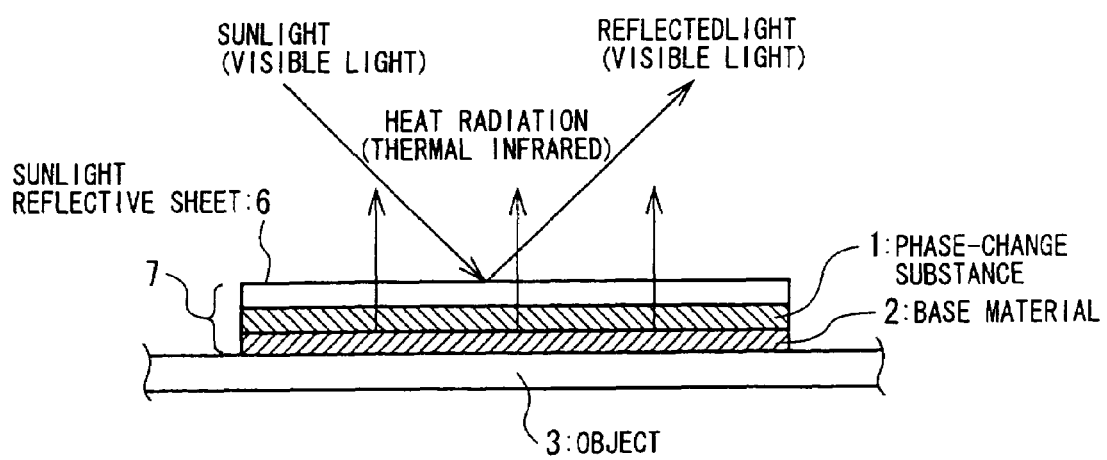
FIG. 4 is a cross-sectional view showing yet another embodiment of a heat controller according to the present invention.

More specifically, in the heat controller 10 according to this embodiment of the present invention, as shown in FIG. 4, a phase-change substance 1 having a thickness of several microns is affixed by printing method with a thick film, a coating method ,vapor deposition or the like to a base material 2 having a thickness of 30 μm to 50 μm, and a base material 2 is mounted to a surface of the object 3 so that it is in intimate thermal contact therewith.

Figure 5:
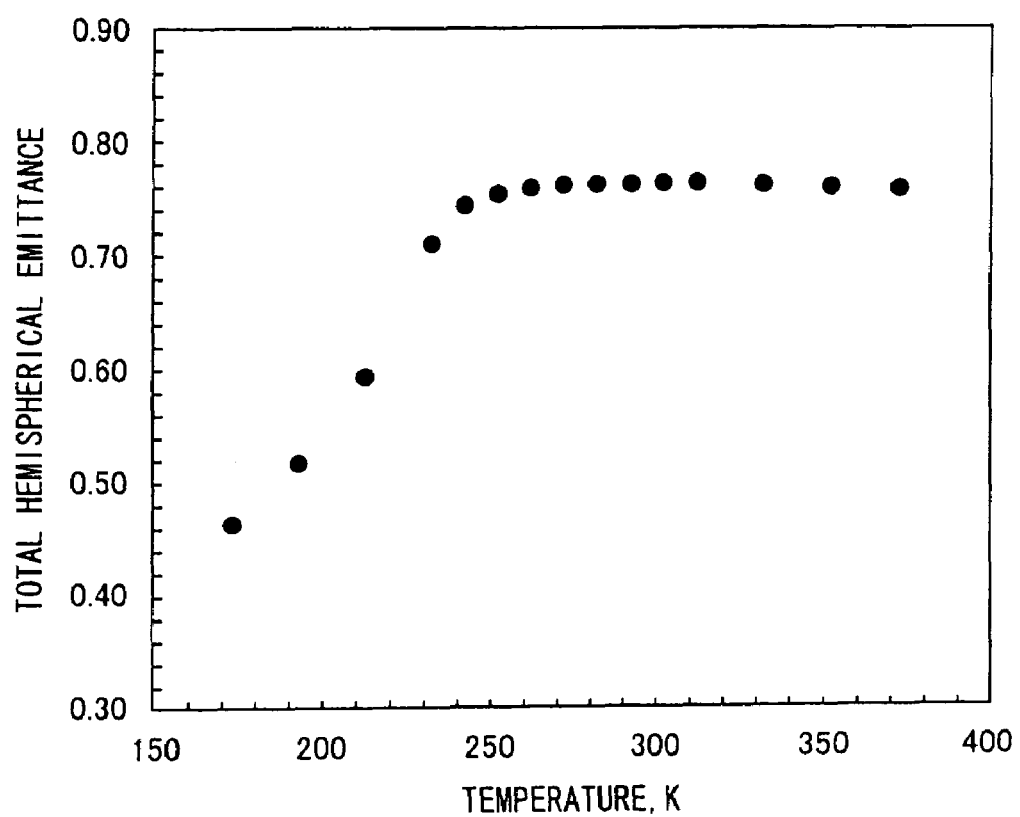
FIG. 5 shows a graph indicating data of temperature dependent emissivity of a thick film made of $La_{0.8}Sr_{0.075}Ca_{0.125}MnO_3$ with a printing method with a thick film.

FIG. 5 shows a graph indicating data of temperature dependent emissivity of a thick film made of $La_{0.8}Sr_{0.075}Ca_{0.125}MnO_3$ and having a thickness of 10 μm, which being formed by a printing method with a thick film on a surface of an Yttria stabilized zirconia substrate having a rectangular configuration of 50 mm by 50 mm with a thickness of 50 microns.

And this graph especially shows a total hemispherical emittance thereof measured under the temperature between 170K to 380K.

Note that, this graph shows an abrupt change in the emittance below 240K which is a transition temperature and it shows that it is metallic in a low temperature area and insulation characteristic in a high temperature.

Additionally, a sunlight reflective sheet 6, which has the properties of passing infrared light and reflecting visible light, is disposed over the phase-change substance 1.

The phase-change substance 1 has a low reflectivity (approximately 0.3) with respect to the sunlight region (0.3 to 2.5 μm), and has a high absorption rate with respect to sunlight.

Therefore, if the phase-change substance 1 is disposed so that sunlight is directly incident thereto, the heat controller 10 itself will absorb a large amount of heat, this being a disadvantage in terms of heat radiation. To solve this problem, as shown in FIG. 4, a sunlight reflective sheet 6 having the characteristics described above is disposed so as to reduce the amount of heat absorbed in the visible light region.

With the exception of sunlight, because the sunlight reflective sheet 6 is transparent (for example, with respect to thermal infrared), the basic operating principle of this heat controller is the same as the first embodiment of the present invention.

The present invention can also be embodied as a method for heat control and, as is clear from the above-noted description of the operation of the heat controller 10, a method for heat control according to the present invention is basically a method for controlling heat in an object such as electronic equipment aboard a space vehicle, whereby a composite material 4 is formed by combining a base material 2 radiating a large amount of heat at a high-temperature phase with a phase-change substance 1 having insulation properties at a high-temperature phase, having metallic properties at a low-temperature phase, radiating a large amount of heat at a high-temperature phase, radiating a small amount of heat at a low-temperature phase, and having a high reflectivity in the thermal infrared region at a low-temperature phase, so as to control the temperature of an object, and directly or indirectly mounting this composite material 4 to an object 3 so as to control the temperature of the object 3.

In a method for controlling heat according to the present invention, it is desirable that the base material 2 have a thickness that is greater than that of the phase-change substance 1.

Additionally, it is preferable in the present invention that the phase-change substance 1 be a perovskite oxide, for example perovskite Mn oxide.

It is additionally preferable in the method for controlling heat according to the present invention that the base material 2 have flexibility.

As noted above, in a method for controlling heat according to the present invention, it is desirable that the reflective sheet 6 having reflectivity with respect to visible light be laminated to the surface of the phase-change substance 1 opposite from the surface to which the base material 2 is laminated.

The composite material 4 or 7 can be affixed to a surface of the object that generates heat, either directly or indirectly via an intervening thermally conductive substance.

By adopting the various technical constitutions described in detail above, a heat controller and method for controlling heat according to the present invention achieve several effects.

One effect of the present invention is that of reducing the thickness of the high-density phase-change substance 1 to several microns, thereby achieving light weight.

In contrast to phase-change substances used in the past, which, in order to achieve the required low-temperature phase and high-temperature phase heat radiation used alone, had a thickness of several hundred microns, the present invention uses a phase-transition substance having a thickness of only several microns combined with a low-density base material having a high heat radiation rate, thereby enabling a reduction in weight in the phase-change substance and the base material, resulting in an overall weight reduction.

The present invention achieves a second effect by using a composite material that includes a flexible base material, which enhances ease of handling, while improving the degree of freedom in mounting, thereby broadening the range of applicability.

The reason for the above effect is that, because in the past the thickness of the phase-change substance was several hundreds of microns, the phase-change substance lacked flexibility and needed to be mounted to a flat surface of an object, whereas with the present invention, because of the flexibility of the base material affixing is also possible to curved surfaces.

What is claimed is:

1. A composite material heat controller for an object, the composite material heat controller comprising:
   a base material that radiates a larger amount of heat at a high-temperature relative to that of the heat radiated at a low-temperature, the base material having a surface adapted to thermally contact a surface of said object; and
   a phase-change substance overlying said base material having insulation properties at the high-temperature, metallic properties at the low-temperature, radiating a larger amount of heat at the high-temperature relative to a smaller amount of heat radiated at the low-temperature, and having a high reflectivity in the thermal infrared light region at the low-temperature;
   wherein said phase-change substance comprises a perovskite oxide or a corundum vanadium oxide and has a thickness in the range from about one to about thirty microns.

2. The composite material heat controller according to claim 1, wherein said base material comprises a thickness greater than a thickness of said phase-change substance.

3. The composite material heat controller according to claim 1, wherein said phase-change substance is a perovskite oxide.

4. The composite material heat controller according to claim 3, wherein said phase-change substance 1 is perovskite Mn oxide.

5. The composite material heat controller according to claim 1, wherein said base material comprises a thickness in the range from 10 to 100 µm.

6. The composite material heat controller according to claim 1, wherein said base material is selected from a group consisting of silicone, alumina, and partially stabilized-zirconia.

7. The composite material heat controller according to claim 1, wherein a reflective plate or reflective film each having reflectivity with respect to visible light is laminated onto said phase-change substance on a side opposite from a side on which said base material is laminated.

8. The composite material heat controller according to claim 1, wherein said surface of said base material of said composite material heat controller is affixed to the surface of the object either directly or via an intervening heat-conductive substance.

9. The composite material heat controller according to claim 8, wherein said composite material heat controller is thermally joined to said object, via an appropriate intervening adhesive.

10. The composite material heat controller according to claim 1, wherein said object comprises a non-flat surface.

11. The composite material heat controller according to claim 1, wherein said object includes an electronic circuit used in a space vehicle, including a man-made satellite and a spaceship.

12. A method for controlling heat in an object comprising:
providing a base material that radiates a larger amount of heat at a high-temperature relative to that of the heat radiated at a low-temperature, the base material having at least a first surface and a second surface;
attaching a phase-change substance on said first surface of said base material, said phase-changing substance having insulation properties at the high-temperature, metallic properties at the low-temperature, radiating a larger amount of heat at the high-temperature relative to a smaller amount of heat radiated at the low-temperature, and having a high reflectivity in the thermal infrared region at the low-temperature phase and comprising perovskite oxide or a corundum vanadium oxide and has a thickness in the range from about one to about thirty microns; and
attaching said second surface of said base material to said object.

13. The method for controlling heat according to claim 12, wherein said base material comprises a thickness greater than a thickness of said phase-change substance.

14. The method for controlling heat according to claim 12, wherein said phase-change substance is a perovskite oxide.

15. The method for controlling heat according to claim 14, wherein said phase-change substance is perovskite Mn oxide.

16. The method for controlling heat according to claim 12, wherein said base material is selected from a group consisting of silicone, alumina and partially stabilized-zirconia.

17. The method for controlling heat according to claim 12, wherein either one of a reflective plate and a reflective film having reflectivity with respect to visible light is laminated onto said phase-change substance on a side opposite from a side attached to said first surface of said base material.

18. The method for controlling heat according to claim 12, wherein said composite material is attached to a surface of said object, either directly or via an intervening heat-conductive substance.

19. The method for controlling heat according to claim 12, wherein said object includes an electronic circuit used in a space vehicle, including a man-made satellite and a spaceship.

* * * * *